US007337607B2

(12) United States Patent
Hou et al.

(10) Patent No.: US 7,337,607 B2
(45) Date of Patent: Mar. 4, 2008

(54) METHOD OF DISPENSING FUEL INTO TRANSIENT FLOW OF AN EXHAUST SYSTEM

(75) Inventors: Zhixin Jason Hou, Maplewood, MN (US); Wayne M. Wagner, Apple Valley, MN (US); Wenzhong Zhang, Savage, MN (US); Edward A. Steinbrueck, Eden Prairie, MN (US); Theodore G. Angelo, West St. Paul, MN (US); Ted J. Wiegandt, Eagan, MN (US); Mike Anderson, Bloomington, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

(21) Appl. No.: 10/560,401

(22) PCT Filed: Jun. 10, 2004

(86) PCT No.: PCT/US2004/018536

§ 371 (c)(1),
(2), (4) Date: Aug. 4, 2006

(87) PCT Pub. No.: WO2005/005797

PCT Pub. Date: Jan. 20, 2005

(65) Prior Publication Data

US 2007/0056264 A1 Mar. 15, 2007

Related U.S. Application Data

(60) Provisional application No. 60/478,679, filed on Jun. 12, 2003.

(51) Int. Cl.
*F01N 3/00* (2006.01)

(52) U.S. Cl. ............................ 60/274; 60/276; 60/286; 60/295; 60/297; 703/8
(58) Field of Classification Search ................ 60/274, 60/276, 277, 284, 285, 286, 295, 297, 303, 60/311; 703/7, 8
See application file for complete search history.

(56) References Cited

U.S. PATENT DOCUMENTS 3,499,269 A     3/1970   Bois (Continued)

FOREIGN PATENT DOCUMENTS

BE        889019        9/1981

(Continued)

OTHER PUBLICATIONS

"Delavan Spray Technologies," *Nozzle Technology*, Coltec Industries, pp. 2.2-2.16, date unknown.

(Continued)

*Primary Examiner*—Binh Q. Tran
(74) *Attorney, Agent, or Firm*—Merchant & Gould P.C.

(57) ABSTRACT

A system or method for controlling the delivery of fuel into the transient flow of an exhaust system to control emissions. A mathematical model representative of the exhaust system can be used to determine, based on operating conditions of the exhaust system, a rate of fuel delivery suitable for achieving a desired result. The desired result can be to increase the temperature of a diesel particulate filter to a temperature suitable for regeneration without exceeding a temperature that may damage the diesel particulate filter.

22 Claims, 6 Drawing Sheets

U.S. PATENT DOCUMENTS

| | | |
|---|---|---|
| 3,654,432 A | 4/1972 | Dyre |
| 3,744,249 A | 7/1973 | August |
| 4,054,418 A | 10/1977 | Miller et al. |
| 4,167,852 A | 9/1979 | Ludecke |
| 4,211,075 A | 7/1980 | Ludecke et al. |
| 4,270,936 A | 6/1981 | Mann |
| 4,276,066 A | 6/1981 | Bly et al. |
| 4,303,552 A | 12/1981 | Ernest et al. |
| 4,319,896 A | 3/1982 | Sweeney |
| 4,360,156 A | 11/1982 | Soth et al. |
| 4,372,111 A | 2/1983 | Virk et al. |
| 4,381,643 A | 5/1983 | Stark |
| 4,391,095 A | 7/1983 | Virk |
| 4,403,473 A | 9/1983 | Gladden |
| 4,404,796 A | 9/1983 | Wade |
| 4,449,362 A | 5/1984 | Frankenberg et al. |
| 4,450,682 A | 5/1984 | Sato et al. |
| 4,471,611 A | 9/1984 | Watanabe |
| 4,481,767 A | 11/1984 | Stark |
| 4,485,621 A | 12/1984 | Wong et al. |
| 4,485,622 A | 12/1984 | Takagi et al. |
| 4,509,327 A | 4/1985 | Enga |
| 4,510,265 A | 4/1985 | Hartwig |
| 4,515,758 A | 5/1985 | Domesle et al. |
| 4,549,398 A | 10/1985 | Oishi et al. |
| 4,573,317 A | 3/1986 | Ludecke |
| 4,617,289 A | 10/1986 | Saito et al. |
| 4,631,076 A | 12/1986 | Kurihara et al. |
| 4,670,020 A | 6/1987 | Rao |
| 4,685,290 A | 8/1987 | Kamiya et al. |
| 4,686,827 A | 8/1987 | Wade et al. |
| 4,711,870 A | 12/1987 | Yamada et al. |
| 4,719,751 A | 1/1988 | Kume et al. |
| 4,730,455 A | 3/1988 | Pischinger et al. |
| 4,759,918 A | 7/1988 | Homeier et al. |
| 4,835,964 A | 6/1989 | Kume et al. |
| 4,851,015 A | 7/1989 | Wagner et al. |
| 4,878,928 A | 11/1989 | Wagner et al. |
| 4,899,540 A | 2/1990 | Wagner et al. |
| 4,902,487 A | 2/1990 | Cooper et al. |
| 5,053,062 A | 10/1991 | Barris et al. |
| 5,065,574 A | 11/1991 | Bailey |
| 5,067,320 A | 11/1991 | Kanesaki |
| 5,081,836 A | 1/1992 | Smith et al. |
| 5,082,478 A | 1/1992 | Oono et al. |
| 5,083,427 A | 1/1992 | Anderson |
| 5,094,075 A | 3/1992 | Berendes |
| 5,097,665 A | 3/1992 | Kammel |
| 5,100,632 A | 3/1992 | Dettling et al. |
| 5,193,340 A | 3/1993 | Kamihara |
| 5,207,990 A | 5/1993 | Sekiya et al. |
| 5,272,874 A | 12/1993 | Paas |
| 5,347,809 A | 9/1994 | Moeckel et al. |
| 5,355,973 A | 10/1994 | Wagner et al. |
| 5,394,692 A | 3/1995 | Teuber-Ernst |
| 5,419,121 A | 5/1995 | Sung et al. |
| 5,522,218 A | 6/1996 | Lane et al. |
| 5,551,971 A | 9/1996 | Chadderton et al. |
| 5,605,042 A | 2/1997 | Stutzenberger |
| 5,606,855 A | 3/1997 | Tomisawa |
| 5,628,186 A * | 5/1997 | Schmelz ................. 60/274 |
| 5,709,080 A | 1/1998 | Arora et al. |
| 5,711,149 A | 1/1998 | Araki |
| 5,746,989 A | 5/1998 | Murachi et al. |
| 5,753,188 A | 5/1998 | Shimoda et al. |
| 5,792,436 A | 8/1998 | Feeley et al. |
| 5,820,833 A | 10/1998 | Kawamura |
| 5,826,425 A | 10/1998 | Rossi Sebastiano et al. |
| 5,839,273 A | 11/1998 | Maus |
| 5,907,950 A | 6/1999 | Enderle et al. |
| 5,938,715 A | 8/1999 | Zhang et al. |
| 5,950,422 A | 9/1999 | Doelling |
| 5,968,464 A | 10/1999 | Peter-Hoblyn et al. |
| 5,974,791 A | 11/1999 | Hirota et al. |
| 6,021,639 A | 2/2000 | Abe et al. |
| 6,023,930 A | 2/2000 | Iwamoto et al. |
| 6,024,927 A | 2/2000 | Ban et al. |
| 6,119,448 A * | 9/2000 | Emmerling et al. ........ 60/274 |
| 6,182,443 B1 | 2/2001 | Jarvis et al. |
| 6,199,375 B1 | 3/2001 | Russell |
| 6,237,326 B1 | 5/2001 | Russell |
| 6,244,047 B1 | 6/2001 | Brehob et al. |
| 6,253,543 B1 | 7/2001 | Russell |
| 6,279,603 B1 | 8/2001 | Czarnik et al. |
| 6,322,605 B1 | 11/2001 | He et al. |
| 6,322,753 B1 | 11/2001 | Lindberg et al. |
| 6,347,511 B1 | 2/2002 | Haines |
| 6,363,716 B1 | 4/2002 | Balko et al. |
| 6,412,276 B1 | 7/2002 | Salvat et al. |
| 6,415,602 B1 * | 7/2002 | Patchett et al. .............. 60/286 |
| 6,449,947 B1 | 9/2002 | Liu et al. |
| 6,470,673 B1 | 10/2002 | van Nieuwstadt et al. |
| 6,471,918 B1 | 10/2002 | Sherwood |
| 6,481,641 B1 | 11/2002 | Mieney |
| 6,487,852 B1 | 12/2002 | Murphy et al. |
| 6,497,095 B2 | 12/2002 | Carberry et al. |
| 6,508,057 B1 | 1/2003 | Bouchez et al. |
| 6,526,746 B1 | 3/2003 | Wu |
| 6,526,753 B1 | 3/2003 | Bailey |
| 6,530,215 B2 | 3/2003 | Alkemade et al. |
| 6,539,708 B1 | 4/2003 | Hofmann et al. |
| 6,550,573 B2 | 4/2003 | Wagner et al. |
| 6,574,956 B1 | 6/2003 | Moraal et al. |
| 6,594,990 B2 | 7/2003 | Kuenstler et al. |
| 6,644,020 B2 | 11/2003 | Kuenstler et al. |
| 6,681,565 B2 | 1/2004 | Russell |
| 6,713,030 B1 | 3/2004 | Chandler et al. |
| 6,722,123 B2 | 4/2004 | Liu et al. |
| 6,814,303 B2 | 11/2004 | Edgar et al. |
| 6,823,663 B2 | 11/2004 | Hammerle et al. |
| 6,834,498 B2 | 12/2004 | van Nieuwstadt et al. |
| 6,862,879 B2 | 3/2005 | Upadhyay et al. |
| 6,882,929 B2 | 4/2005 | Liang et al. |
| 6,895,747 B2 | 5/2005 | Upadhyay et al. |
| 6,928,806 B2 | 8/2005 | Tennison et al. |
| 6,973,776 B2 | 12/2005 | van Nieuwstadt et al. |
| 6,983,589 B2 * | 1/2006 | Lewis et al. ................. 60/277 |
| 6,990,800 B2 * | 1/2006 | van Nieuwstadt et al. .... 60/277 |
| 6,996,976 B2 | 2/2006 | Rumminger et al. |
| 7,000,383 B2 | 2/2006 | van Nieuwstadt et al. |
| 7,021,047 B2 | 4/2006 | Hilden et al. |
| 7,047,728 B2 * | 5/2006 | Yasui ....................... 60/285 |
| 7,048,891 B2 * | 5/2006 | Kinugawa et al. ............ 422/94 |
| 7,100,366 B2 | 9/2006 | Hager et al. |
| 7,168,241 B2 | 1/2007 | Rudelt et al. |
| 2002/0044897 A1 | 4/2002 | Kakwani et al. |
| 2002/0178716 A1 | 12/2002 | Hammerle et al. |
| 2002/0182134 A1 | 12/2002 | Wu et al. |
| 2002/0194835 A1 | 12/2002 | Bromberg et al. |
| 2003/0089104 A1 | 5/2003 | Colignon |
| 2004/0093856 A1 | 5/2004 | Dingle et al. |
| 2004/0098973 A1 | 5/2004 | Tennison et al. |
| 2004/0098975 A1 | 5/2004 | van Nieuwstadt et al. |
| 2005/0000211 A1 | 1/2005 | Fayard |

FOREIGN PATENT DOCUMENTS

| | | |
|---|---|---|
| DE | 199 46 901 A1 | 4/2001 |
| DE | 100 43 613 A1 | 2/2002 |
| EP | 0 070 619 A2 | 1/1983 |
| EP | 1 111 211 A2 | 6/2001 |
| EP | 1 149 991 A2 | 10/2001 |
| EP | 1 158 143 A2 | 11/2001 |
| EP | 1 273 773 A2 | 1/2003 |

| | | | |
|---|---|---|---|
| EP | 1 223 312 B1 | | 10/2004 |
| GB | 2 064 983 A | | 6/1981 |
| GB | 2 076 696 A | | 12/1981 |
| GB | 2 084 898 A | | 4/1982 |
| GB | 2 134 407 A | | 8/1984 |
| JP | 59-520 | | 1/1984 |
| JP | 63-198717 | | 8/1988 |
| JP | 5-44435 | | 2/1993 |
| JP | 9-222009 | | 8/1997 |
| JP | 10089057 | | 4/1998 |
| WO | WO 01/34950 A1 | | 5/2001 |

OTHER PUBLICATIONS

"Fact Sheet re: Diesel Particulate Matter," pp. 2-8, date unknown.

"How a Nozzle Works," pp. 3-5, date unknown.

Catlin, C. et al., "Physical Processes Influencing Effervescent Atomizer Performance in the Slug and Annular Flow Regimes," *Atomization and Sprays*, vol. 11, pp. 575-595 (2001).

Fayard, J. et al., "A New DPF System for Duty Cycle Vehicles," *Technologies*, pp. 77-85 (2004).

Kim, J. et al., "Dependence of Spraying Performance on the Internal Flow Pattern in Effervescent Atomizers," *Atomization and Sprays*, vol. 11, pp. 735-756 (2001).

Letebvre, H., "Effervescent Atomizers," *Automization and Sprays*, Taylor & Francis, 2 pages (1989).

Page, D. et al., "The QuadCAT™ Four-Way Catalytic Converter: An Integrated Aftertreatment System for Diesel Engines," *SAE Technical Paper Series*, pp. 1-8 (Aug. 17-19, 1999).

Sovani, S. et al., "Effervescent atomization," *Progress in Energy and Combustion Science*, vol. 27, pp. 483-521 (2001).

Suresh, A. et al., "A Study of the Effect of a Catalyzed Particulate Filter on the Emissions from a Heavy-Duty Diesel Engine with EGR," pp. 1-19 (2001).

Notification of Transmittal of the International Search Report and the Written Opinion of the International Searching Authority, or the Declaration from International Application No. PCT/US2005/045505 mailed Apr. 18, 2006.

Written Opinion of the International Preliminary Examining Authority from International Application No. PCT/US2005/045505 mailed Feb. 5, 2007.

Notification of Transmittal of the International Preliminary Report on Patentability from International Application No. PCT/US2005/045505 mailed Mar. 22, 2007.

* cited by examiner

METHOD OF DISPENSING FUEL INTO TRANSIENT FLOW OF AN EXHAUST SYSTEM

TECHNICAL FIELD

The present disclosure relates generally to diesel exhaust systems. More particularly, the present disclosure relates to systems and methods for controlling diesel emissions.

BACKGROUND

Vehicles equipped with diesel engines typically include exhaust systems that may have diesel particulate filters for removing particulate matter from the exhaust stream. With use, soot or other carbon-based particulate matter to accumulates on the diesel particulate filters. As particulate matter accumulates on the diesel particulate filters, the restriction of the filters increases causing the buildup of undesirable back pressure in the exhaust systems. High back pressures decrease engine efficiency. Therefore, to prevent diesel particulate filters from becoming excessively loaded, diesel particulate filters should be regularly regenerated by burning off (i.e., oxidizing) the particulates that accumulate on the filters. Since the particulate matter captured by diesel particulate filters is mainly carbon and hydrocarbons, its chemical energy is high. Once ignited, the particulate matter burns and releases a relatively large amount of heat.

Systems have been proposed for regenerating diesel particulate filters. Some systems use a fuel fed burner positioned upstream of a diesel particulate filter to cause regeneration (see U.S. Pat. No. 4,167,852). Other systems use an electric heater to regenerate a diesel particulate filter (see U.S. Pat. Nos. 4,270,936; 4,276,066; 4,319,896; 4,851,015; and British Published Application No. 2,134,407). Detuning techniques are also used to regenerate diesel particulate filters by raising the temperature of exhaust gas at selected times (see U.S. Pat. Nos. 4,211,075 and 3,499,260). Self regeneration systems have also been proposed. Self regeneration systems can use a catalyst on the substrate of the diesel particulate filter to lower the ignition temperature of the particulate matter captured on the filter. An example self regeneration system is disclosed in U.S. Pat. No. 4,902,487.

In addition to particulate filters for removing particulate matter, exhaust systems can be equipped with structures for removing other undesirable emissions such as carbon monoxide (CO), hydrocarbons (HC) and nitrogen oxides (NOx). Catalytic converters are typically used to remove CO and HC. NOx can be removed by structures such as lean NOx catalysts, selective catalytic reduction (SCR) catalysts and lean NOx traps.

Lean NOx catalysts are catalysts capable of converting NOx to nitrogen and oxygen in an oxygen rich environment with the assistance of low levels of hydrocarbons. For diesel engines, hydrocarbon emissions are too low to provide adequate NOx conversion, thus hydrocarbons are required to be injected into the exhaust stream upstream of the lean NOx catalysts. SCR's are also capable of converting NOx to nitrogen and oxygen. However, in contrast to using HC's for conversion, SCR's use reductants such as urea or ammonia that are injected into the exhaust stream upstream of the SCR's. NOx traps use a material such as barium oxide to absorb NOx during lean burn operating conditions. During fuel rich operations, the NOx is desorbed and converted to nitrogen and oxygen by catalysts (e.g., precious metals) within the traps.

SUMMARY

One inventive aspect of the present disclosure relates to a system or method for controlling the delivery of fuel into the transient flow of an exhaust system to control emissions. In one embodiment, a mathematical model representative of the exhaust system is used to determine, based on operating conditions of the exhaust system, a rate of fuel delivery suitable for achieving a desired result. In one example, the desired result can be to increase the temperature of a diesel particulate filter to a temperature suitable for regeneration without exceeding a temperature that may damage the diesel particulate filter.

DETAILED DESCRIPTION

One inventive aspect of the present disclosure relates to a technique for varying the rate at which fuel is dispensed/delivered into the transient flow of an exhaust system. The technique involves using a mathematical model representative of the exhaust system to determine fuel delivery rates suitable for achieving desired results taking into consideration the operating conditions of the system on a real time basis. By using a mathematical model, the fuel delivery rate can be quickly modified in response to variations in the operating conditions of the exhaust system without requiring a large amount of testing as might be required by a strictly empirical modeling approach. To enhance the speed and flexibility of the mathematical model, the model preferably relies upon a relatively small number of inputs (e.g., provided by sensors or other inputs) determined to have the most substantial effect on the operating conditions of the exhaust system. The effects of other variables can be incorporated into the model. Thus, the system can effectively operate with a fewer number of input sources.

Another inventive aspect of the present disclosure relates to a system for regenerating a diesel particulate filter. The system includes a fuel supply device positioned upstream from the diesel particulate filter. A controller controls the rate fuel is dispensed by the fuel supply device. The controller interfaces with input sources that provide data representative of characteristics of the exhaust gas being conveyed through the exhaust system. Based on the characteristics of the exhaust gas, the controller causes the fuel supply device to dispense fuel into the exhaust stream at a rate sufficient to cause the controlled regeneration of diesel particulate filter. In one embodiment, the fuel supply device is positioned upstream from a catalytic converter (DOC) that is positioned upstream from the diesel particulate filter. The diesel particulate filter may or may not include a catalyst. The desired fuel injection rate is preferably selected such that when the fuel combusts within the catalytic converter, the temperature of the exhaust gas exiting the catalytic converter and traveling to the diesel particulate filter is in the range of 500 to 700° C. In a more preferred embodiment, the temperature of the exhaust gas exiting the catalytic converter is in the range of 550 to 650° C. In a most preferred embodiment, the gas exiting the catalytic converter is about 600° C.

In a preferred embodiment, the above-described controller uses a mathematical model to determine the appropriate fuel injection rate for achieving a temperature at the diesel particulate filter that is suitable for causing regeneration of the diesel particulate filter without damaging the diesel particulate filter. For example, the controller can use a model based on a transient energy balance equation for a control volume that includes the DOC. By accessing a relatively small amount of data from the exhaust system (e.g., exhaust temperature entering the control volume, exhaust temperature exiting the control volume, and mass flow through the control volume), the controller can use the model to determine the appropriate rate for fuel to be injected into the system to achieve the desired regeneration temperature. Preferably, the model can take into account the effects of fuel preparation (e.g., fuel vaporization efficiency), DOC performance (e.g., DOC hydrocarbon conversion efficiency) and DOC thermal responses (e.g., DOC energy transfer rates).

In alternative embodiments, the fuel injector can inject fuel directly into the diesel particulate filter without having a preheating process provided by combustion within an upstream catalytic converter. In such embodiments, the fuel ignites with the catalyst on the diesel particulate filter thereby causing oxidation of the particulate matter on the filter.

I. Example System

Figure 1:
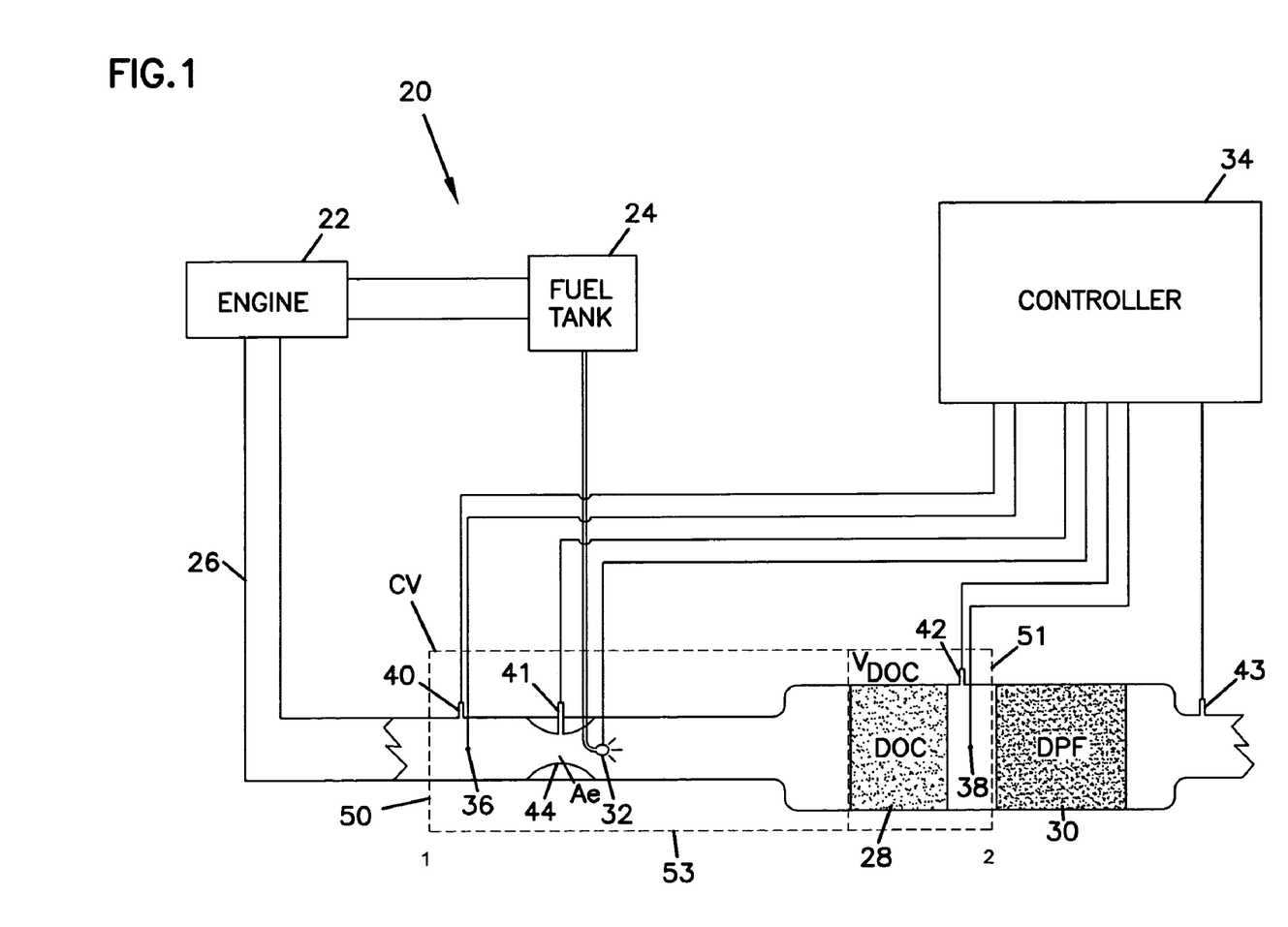
FIG. 1 schematically illustrates an exhaust system having features that are examples of inventive aspects in accordance with the principles of the present disclosure.

FIG. 1 illustrates an exhaust system 20 having features that are examples of inventive aspects in accordance with the principles of the present disclosure. The system includes an engine 22 (e.g., a diesel engine), a fuel tank 24 for supplying fuel (e.g., diesel fuel) to the engine 22, and an exhaust conduit 26 for conveying exhaust gas away from the engine 22. The system 20 also includes a catalytic converter 28 (i.e., DOC) and a diesel particulate filter 30 positioned along the conduit. The catalytic converter 28 is preferably positioned upstream from the diesel particulate filter 30. The system further includes a fuel supply device 32 and a controller 34 for controlling the rate in which fuel is dispensed (e.g., injected or sprayed) into the exhaust stream by the fuel supply device 32. In one embodiment, the fuel supply device may include a fuel injector and one or more spray nozzles.

The fuel supply device 32 preferably inputs fuel at a location between the catalytic converter 28 and the engine 22. Preferably, the fuel supply device 32 inputs fuel to the conduit 26 at a location immediately upstream from the catalytic converter 28. In one embodiment, fuel is supplied to the exhaust stream at a location within 36 inches of the catalytic converter 28. In another embodiment, the fuel is supplied at a location within 12 inches of the catalytic converter.

The fuel supply device 32 is used to spray fuel from the fuel tank 24 into the exhaust stream traveling through the conduit 26 at a location upstream from the catalytic converter 28. The fuel supplied by the fuel supply device 32 combusts within the catalytic converter 28 thereby generating heat. The heat generated by combustion of fuel within the catalytic converter 28 preferably raises the temperature of the exhaust gas exiting the catalytic converter 28 to a temperature above the combustion temperature of the particulate matter accumulated on the diesel particulate filter. In this manner, by burning fuel in the catalytic converter, sufficient heat is generated to cause regeneration of the diesel particulate filter. Preferably, the rate that I fuel is dispensed into the exhaust stream is also controlled to prevent temperatures from exceeding levels which may be detrimental to the diesel particulate filter.

It will be appreciated the catalytic converter 28 and the diesel particulate filter function to treat the exhaust gas that passes through the conduit 26. Other structures for treating the exhaust gas such as mufflers for attenuating noise, SCR catalysts, lean NOx catalytic converters and NOx traps/absorbers can also be provided along the conduit 26.

II. Controller

The controller 34 functions to control the rate that fuel is dispensed by the fuel supply device 32 a given time to cause regeneration of the diesel particulate filter 30. The controller 34 interfaces with a number of sensing devices or other data inputs that provide data representative of the exhaust gas traveling through the conduit 26. For example, the controller 34 interfaces with a first temperature probe 36 positioned upstream of the catalytic converter 28 and a second temperature probe 38 positioned between the catalytic converter 28 and the diesel particulate filter 30. The controller 34 also interfaces with first, second, third and fourth pressure sensors 40-43. The second pressure sensor 41 is located at a venturi 44 positioned within the conduit 26 at a location upstream from the catalytic converter 28. The first pressure sensor 40 as well as the first temperature probe 36 are located upstream of the venturi 44. The third pressure sensor 42 is located between the catalytic converter 28 and the diesel particulate filter 30. The fourth pressure sensor 43 is located downstream of the diesel particulate filter 30.

The venturi 44 has a known cross-sectional area $A_e$, and the pressure readings from pressure sensors 40, 41 allow a mass flow rate through the conduit 26 to be determined. It will be appreciated that other types of mass flow sensors other than the venturi and pressure sensors could also be used. Mass flow can also be determined by other means such as accessing data from an engine controller that is indicative of the operating condition of the engine, measuring engine operating characteristics or through the use of a mass flow sensor positioned at the engine intake. Example engine operating characteristics include engine speed (e.g., rotations-per-minute), manifold absolute pressure and manifold temperature. Other engine characteristics include the displacement amount per engine rotation as well as the volumetric efficiency of the engine. Based on the operating conditions of the engine, the mass flow can be calculated or estimated.

As described below, the controller 34 can use information provided from the pressure sensors 40-43, temperature probes 36, 38 or other inputs to determine the rate that fuel should be dispensed into the exhaust gas stream to regenerate the diesel particulate filter 30 in a controlled manner. In one embodiment, the controller accesses data from the pressure sensors 40-42, and also accesses temperature data from the probes 36, 38. The venturi 44 allows mass flow through the system to be determined. The accessed data is preferably input by the controller into a mathematical model of the actual exhaust system. By using the mathematical model, the controller determines the appropriate rate for dispensing fuel to raise the exhaust gas temperature reaching the diesel particulate filter to a level conducive for regeneration without exceeding a temperature that would be detrimental to the diesel particulate filter.

To promote a controlled and efficient regeneration of the diesel particulate filter 30, it is desirable for the temperature of the exhaust gas exiting the catalytic converter 28 to have a target temperature in the range of 500 to 700° C., as indicated above. Thus, the rate that fuel is dispensed upstream of the catalytic converter 28 is preferably selected so that upon combustion of the fuel within the catalytic converter 28, the exhaust gas exiting the catalytic converter is within the target temperature range.

The controller 34 can also be used to determine when the diesel particulate filter is in need of regeneration. Any number of strategies can be used for determining when the diesel particulate filter should be regenerated. For example, the controller can regenerate the filter 30 when the pressure sensors indicate that the back pressure exceeds a predetermined level. The controller 34 can also regenerate the filter 30 at predetermined time intervals. The controller can also be programmed to delay regeneration if conditions of the exhaust system are not suitable for regeneration (e.g., if the exhaust flow rate or exhaust temperature is not suitable for controlled regeneration). For such an embodiment, the controller can be programmed to monitor the operating conditions of the exhaust system and to initiate regeneration only when predetermined conditions suitable for regeneration have been satisfied.

III. Diesel Particulate Filter

The diesel particulate filter 30 can have a variety of known configurations. An exemplary configuration includes a monolith ceramic substrate having a "honey-comb" configuration of plugged passages as described in U.S. Pat. No. 4,851,015 that is hereby incorporated by reference in its entirety. Wire mesh configurations can also be used. In certain embodiments, the substrate can include a catalyst. Exemplary catalysts include precious metals such as platinum, palladium and rhodium, and other types of components such as base metals or zeolites.

The diesel particulate filter 30 preferably has a particulate mass reduction efficiency greater than 75%. More preferably, the diesel particulate filter has a particulate mass reduction efficiency greater than 85%. Most preferably, the diesel particulate filter 30 has a particulate mass reduction efficiency equal to or greater than 90%. For purposes of this specification, the particulate mass reduction efficiency is determined by subtracting the particulate mass that enters the filter from the particulate mass that exits the filter, and by dividing the difference by the particulate mass that enters the filter.

IV. Catalytic Converter

The catalytic converter 28 can have a variety of known configurations. Exemplary configurations include substrates defining channels that extend completely therethrough. Exemplary catalytic converter configurations having both corrugated metal and ceramic substrates are described in U.S. Pat. No. 5,355,973, that is hereby incorporated by reference in its entirety. The substrates preferably include a catalyst. For example, the substrate can be made of a catalyst, impregnated with a catalyst or coated with a catalyst. Exemplary catalysts include precious metals such as platinum, palladium and rhodium, and other types of components such as base metals or zeolites.

In one non-limiting embodiment, the catalytic converter 28 can have a cell density of at least 200 cells per square inch, or in the range of 200-400 cells per square inch. A preferred catalyst for the catalytic converter is platinum with a loading level greater than 30 grams/cubic foot of substrate.

In other embodiments the precious metal loading level is in the range of 30-100 grams/cubic foot of substrate. In certain embodiments, the catalytic converter can be sized such that in use, the catalytic converter has a space velocity (volumetric flow rate through the DOC/volume of DOC) less than 150,000/hour or in the range of 50,000-150,000/hour.

V. Determination of Fuel Dispensing Rate

In accordance with an inventive aspect of the present disclosure, a control equation for determining the rate for fuel to be dispensed into the system by the fuel supply device 32 can be derived using a transient energy balance equation for a given control volume. In the present disclosure, a control volume CV is selected that includes an upstream end 50 positioned upstream from the venturi 44, and a downstream end 51 positioned between the catalytic converter 38 and the diesel particulate filter 30.

The transient energy balance equation is applied to the control volume as follows:

$$\underset{(A)}{\frac{\partial}{\partial t}(\rho c_p T)} + \underset{(B)}{\frac{\partial}{\partial x}(\rho u c_p T)} = \underset{(C)}{\frac{\partial}{\partial x_i}\left(k\frac{\partial T}{\partial x_i}\right)} + \underset{(D)}{S_f/V_{cv}} + \underset{(E)}{S_{DOC}/V_{cv}} \quad (1)$$

where:

A is the time rate of change of energy within the control volume CV per unit volume;

B is the net energy flow per unit volume carried by the mass flow leaving the control volume CV;

C is the net energy flow per unit volume carried by conduction entering through side walls 53 of the control volume CV;

D is the heat release rate per unit volume of fuel injected by the fuel supply 32 and combusted at the catalytic converter 38; and E is the heat energy transfer rate per unit volume between the catalytic core of the catalytic converter 28 and the mass flow.

In solving the equation, it will be appreciated that:

$$S_f = \eta_{vap}\eta_c h_l \dot{m}_f, \quad \text{Heat release rate of fuel injected} \quad (2)$$

$$S_{DOC} = -hA_{DOC}(T_{gas} - T_{DOC}) \quad \text{Heat transfer rate between gas and DOC} \quad (3)$$

$$S_{DOC} = -\frac{\partial}{\partial t}(\rho_{DOC}V_{DOC}c_{p_{DOC}}T_{DOC}) \quad \text{Rate of energy change in DOC} \quad (4)$$

Then, combining (1), (2) and (3), ignoring term C in (1)[1] and integrating over the control volume:

[1] For this application, the value C is presumed to be relatively small and therefore can be ignored. For other applications, it may be desirable to include the C value.

$$\frac{\lfloor(\overline{\rho}_{cv}V_{cv}c_p\overline{T}_{cv})_n - (\overline{\rho}_{cv}V_{cv}c_p\overline{T}_{cv})_{n-1}\rfloor}{\Delta t} + [(\rho_2 Q_2 c_p T_2) - (\rho_1 Q_1 c_p T_1)] = \\ \eta_{vap}\eta_c h_l \dot{m}_f - hA_{DOC}(T_{gas} - T_{DOC}) \quad (5)$$

since

-continued $$\overline{P}_{cv} = \frac{\overline{P}_{cv}}{R\overline{T}_{cv}} \quad (6)$$

we arrive at the following expressions when solving for the required fuel mass flow $$\dot{m}_f = \frac{\left\{\begin{array}{l}\left[\dfrac{(\overline{P}_{cv}V_{cv}c_p)_n - (\overline{P}_{cv}V_{cv}c_p)_{n-1}}{R\Delta t}\right] + \\ \left[(\dot{m}_2 c_p T_{2_{des}}) - (\dot{m}_1 c_p T_1)\right] + hA_{DOC}(T_{gas} - T_{DOC})\end{array}\right\}}{\eta_{vap}\eta_c h_l} \quad (7)$$

Further, equating (3) and (4):

$$\frac{m_{DOC} c_{p_{DOC}} (T_{DOC_n} - T_{DOC_{n-1}})}{\Delta t} = hA_{DOC}(T_{gas} - T_{DOC_{n-1}}) \quad (8)$$

we obtain the mean DOC temperature $$T_{DOC_n} = \frac{hA_{DOC}\Delta t}{m_{DOC} c_{p_{DOC}}}(T_{gas} - T_{DOC_{n-1}}) + T_{DOC_{n-1}} \quad (9)$$

where
Symbols:
  $A_{DOC}$=DOC flow exposed surface area [m²]
  $c_p$=specific heat [J/kg·K]
  h=heat transfer coefficient between exhaust gas and DOC [W/m²K]
  $h_l$=fuel lower heating value [J/kg]
  k=thermal conductivity [W/ms]
  m=mass [kg]
  $\dot{m}$=mass flow rate of exhaust gas unless indicated otherwise [kg/s]
  $\dot{m}_f$=required mass flow rate of fuel [kg/s]
  P=pressure [Pa]
  Q=volumetric flow rate [m³/s]
  R=ideal gas constant for exhaust gas [J/kg·K]
  $S_f$=heat release rate of fuel injected [W]
  $S_{DOC}$=heat transfer rate between gas and DOC [W]
  T=exhaust gas temperature [K]
  $T_{gas}$=mean gas temperature in DOC [K]
  $T_{DOC}$=mean temperature of DOC substrate [K]
  t=time [s]
  u=velocity [m/s]
  V=volume [m³]
  x=coordinate in the axial direction [m]
  $x_i$=stands for x, y, z for i=1, 2, 3 [m]
  $\Delta t$=computational time step [s]
  ρ=density [kg/m³]
  $\eta_{vap}$=fuel vaporization efficiency
  $\eta_c$=DOC fuel conversion efficiency
Suffixes:
  cv=control volume
  DOC=DOC
  des=desired (target) value
  f=fuel
  n=current time n−1=previous time
1=upstream location of control volume
2=downstream location of control volume By using formula (9), the current temperature of the DOC ($T_{DOC_n}$) can be calculated. By inserting the $T_{DOC_n}$ value into the formula (8) along with other sensed data and known constants, the controller 34 can estimate the fuel dispensing rate required to be supplied into the exhaust stream via the fuel supply device 32 to cause the temperature of the exhaust gas exiting the catalytic converter 28 to equal the target temperature $T_{2_{des}}$ or to be within a target temperature range. The formula (8) can also be used to construct data matrixes that are used by the controller to determine the fuel injection rate required to achieve a given target temperature when the exhaust gas has a given set of characteristics as determined by sensors or other inputs.

Attached hereto at Appendix 1 is a chart showing calculated fuel mass flow rate values for example operating conditions. Initially, the fuel flow rate is selected to ramp-up the exhaust temperature exiting the control volume from the beginning temperature to the target regeneration temperature. Once the target temperature is reached, the fuel mass flow is selected to maintain the target regeneration temperature. As shown at Appendix 1, the only sensed/variable data used by the controller includes the temperature at the control volume inlet and outlet (provided by probes 36, 38), the pressure at the control volume inlet and outlet (provided by pressure sensors 40 and 42) and the exhaust mass flow rate (provided by pressure reading at the venturi 44 or other means). In addition to the variable data, the controller also uses a number of constant values that are preferably stored in memory. For example, system constant values specific to the control volume (e.g., the volume, mass and surface area of the DOC) can be stored in memory. Other data stored in memory includes application inputs, target temperatures, gas constants for the exhaust gas, and mapped data saved in look-up tables relating to fuel/operating characteristics at given temperatures and pressures such as fuel vaporization efficiency, DOC conversion efficiency and DOC heat transfer coefficient.

VI. Other Systems

Figure 2:
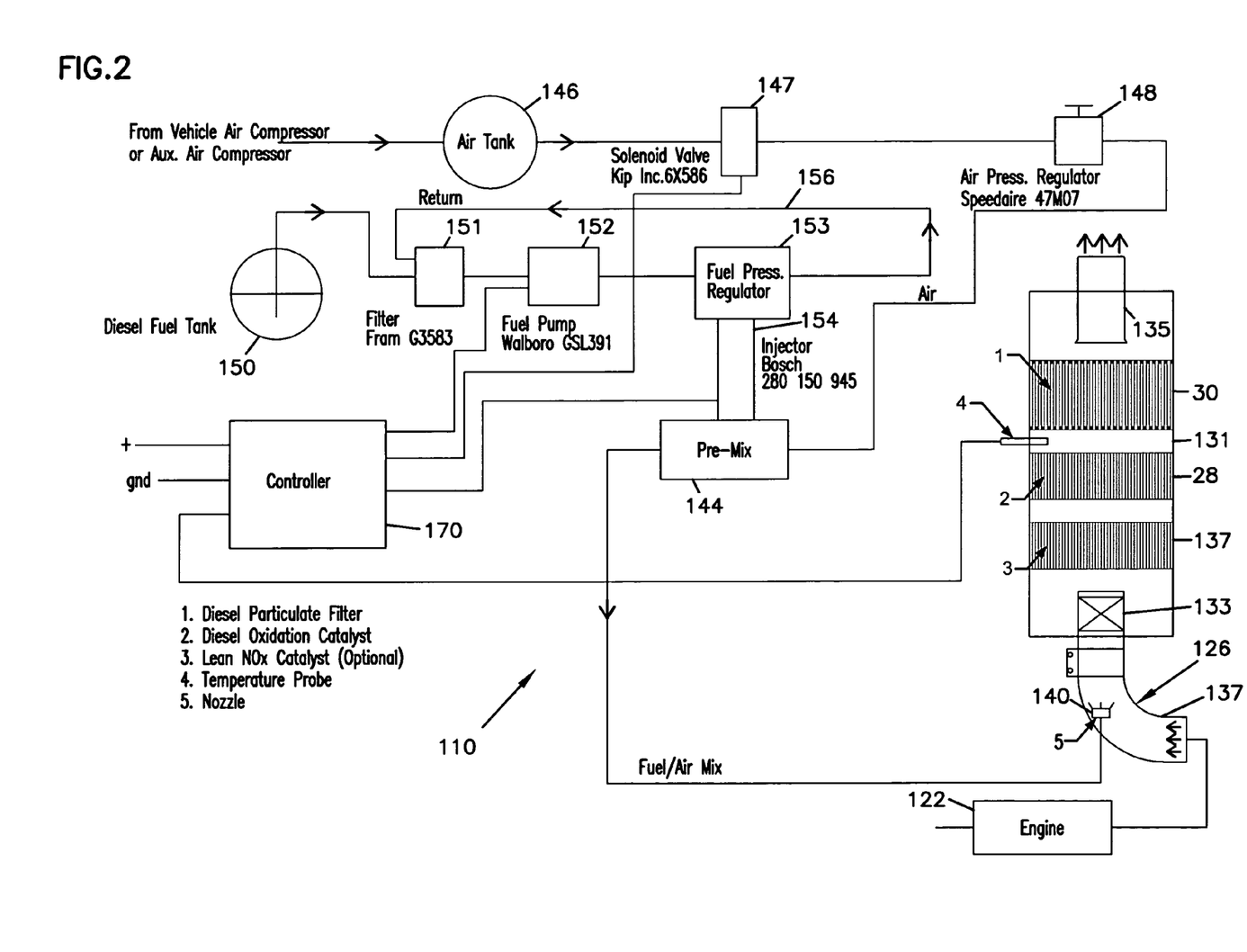
FIG. 2 schematically illustrates an alternative exhaust system.
Figure 3:
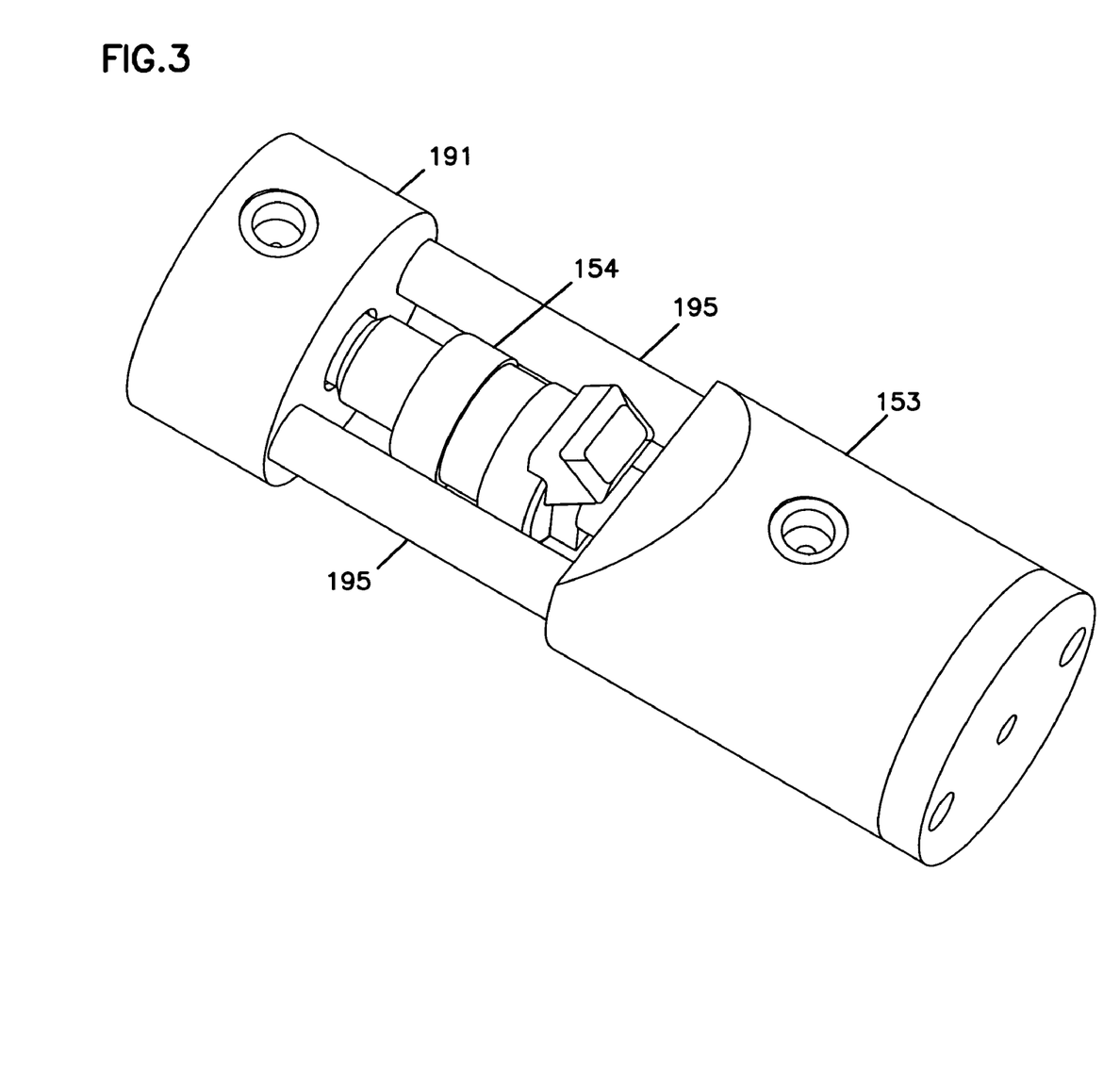
FIG. 3 shows a fuel injection arrangement having features that are examples of inventive aspects in accordance with the principles of the present invention.
Figure 4:
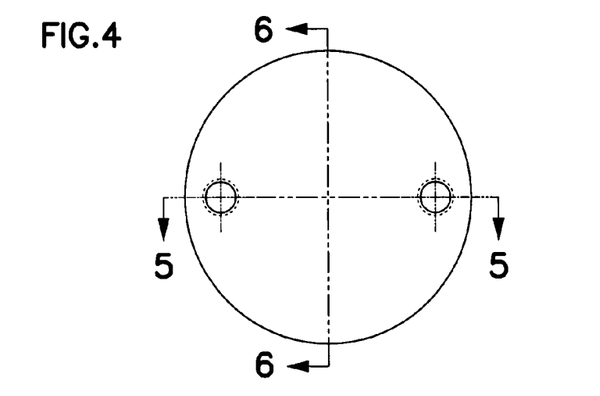
FIG. 4 is an end view of the arrangement of FIG. 3.
Figure 5:
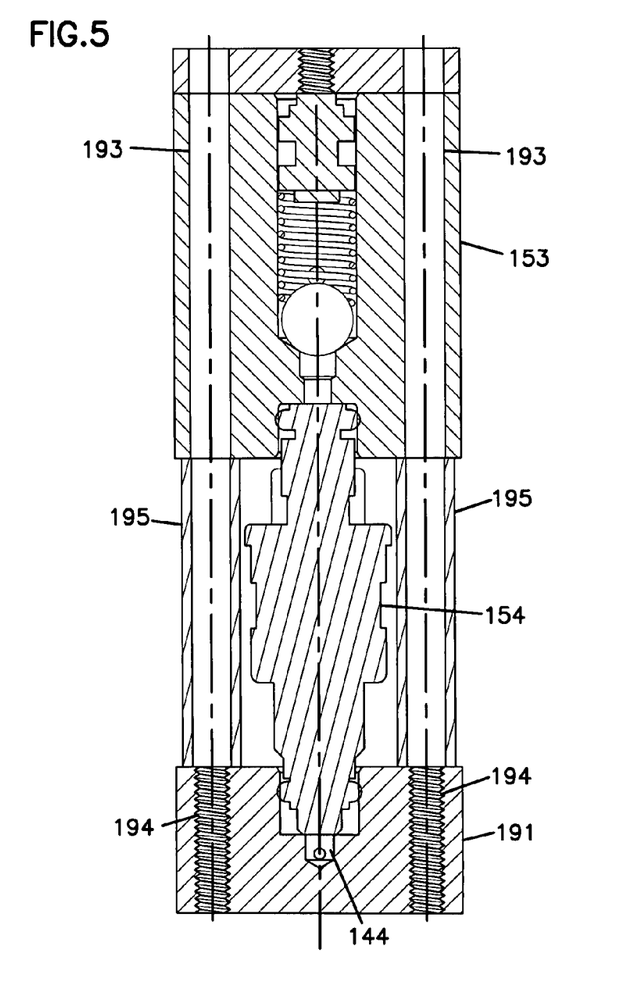
FIG. 5 is a cross-sectional view taken along section line 5-5 of FIG. 4.

FIG. 2 shows an alternative exhaust treatment system 110 for treating the exhaust of a diesel engine 122. The system 110 includes an exhaust conduit 126 for conveying exhaust gas away from the engine 122. A muffler 131 is positioned along the conduit 126. The muffler 131 includes an inlet pipe 133 and an outlet pipe 135. The inlet pipe 133 preferably includes a structure for distributing flow as described in U.S. Pat. No. 6,550,573, that is hereby incorporated by reference in it entirety. The inlet pipe 133 is shown clamped to an elbow 137.

A number of structures for treating exhaust gas are positioned within the muffler 131. For example, a diesel particulate filter 30 is shown mounted adjacent the outlet end of the muffler 131. Also, a catalytic converter 28 is mounted within the muffler immediately upstream of the particulate filter 30. Moreover, an optional lean NOx filter 137 is shown mounted within the muffler upstream of the catalytic converter 28.

The exhaust treatment system also includes a fuel injection system for injecting fuel into the exhaust conduit 126 at a location upstream from the catalytic converter 28. As shown in FIG. 2, the fuel injection system includes a nozzle 140 positioned at the elbow 137. The nozzle 140 is adapted to inject a mixture of fuel and air into the exhaust stream. The fuel and air are pre-mixed before reaching the nozzle 140 at a pre-mix region 144 (i.e., a mixing chamber or mixing location). In one embodiment, the fuel pressure is at least 30 pounds per square inch (psi) greater than the air pressure or in the range of 30-50 psi greater than the air pressure. In other embodiments, the fuel pressure is at least 40 psi greater than the air pressure.

Air is provided to the pre-mix region 144 from an air tank 146. It will be appreciated that the air tank can be provided by the vehicle air compressor, or can be provided by an auxiliary air compressor (e.g., an electric air compressor). A solenoid valve 147 and an air pressure regulator 148 control air flow to the pre-mix region 144. The air pressure regulator 148 can also provide a filtering function. In certain embodiments, the air pressure provided to the pre-mix region 144 is in the range of 10-50 psi or 20-40 psi. In other embodiments, the air pressure is about 30 psi.

Fuel is provided to the pre-mix region 144 from a fuel tank 150 of the engine 122. A fuel pump 152 (e.g., a positive displacement pump) draws fuel from the tank 150. A filter 151 is positioned between the pump 152 and the tank 150, and a fuel pressure regulator 153 is positioned downstream from the pump 152. The fuel pressure regulator 153 provides fuel to a fuel injector 154 (e.g., a Bosch 280 150 945 injector) for injecting fuel into the pre-mix region 144. In certain embodiments, the fuel pressure provided to the injector 154 is in the range of 40-100 psi or 60-80 psi. In other embodiments, the fuel pressure is about 70 psi. The pressure regulator 153 is also in fluid communication with a relief circuit 156 that returns flow to the filter 151 which functions as a fuel reservoir.

The system also includes a controller 170 that controls the fuel injection rate of the fuel injector 154. In the depicted embodiment, the controller receives temperature data from a temperature probe 181 located between the catalytic converter 28 and the diesel particulate filter 30. In certain embodiments, the controller can rely exclusively on the temperature data from the probe 181 (which measures the temperature of the exhaust gas exiting the catalytic converter 28) to determine the rate of fuel to be injected into the exhaust gas stream. In other embodiments, additional data can be used by the controller to determine the fuel injection rate necessary to reach a target temperature. For example, the controller 170 can access data provided by pressure sensors, and additional temperature sensors as shown in the embodiment of FIG. 1 or other inputs as previously described. Moreover, mass flow data from other sources such as by accessing data from an engine controller, measuring engine operating characteristics or through the use of a mass flow sensor positioned at the engine intake.

Similar to previous embodiments, the controller 170 can use the data described above in concert with a transient energy balance model to determine the rate for fuel to be injected into the system to provide a target regeneration temperature output from the catalytic converter.

The controller 170 interfaces with the solenoid valve 147, the fuel pump 152 and the injector 154 to control the rate of fuel dispensed/sprayed by the system.

In a preferred embodiment, valve 147, air pressure regulator 148, filter 151, fuel pump 152, fuel pressure regulator 153, injector 154 and mixing chamber 144 are packaged within a single housing having fuel line connections, air line connections and electrical connections.

FIGS. 3-6 show an example arrangement of the fuel injector 154, the fuel pressure regulator 153 and the pre-mix region 144 of the fuel injection system described above. The arrangement includes injector 154 mounted between fuel regulator 153 and a mixing housing 191. The components can be held together by fasteners such as bolts (not shown) that extend through openings 193 (see FIG. 5) defined by the fuel regulator 153. The fasteners can thread within tapped openings 194 (see FIG. 5) defined by the mixing housing 191. The fasteners also can extend through spacer tubes 195 positioned on opposite sides of the injector 154.

Figure 6:
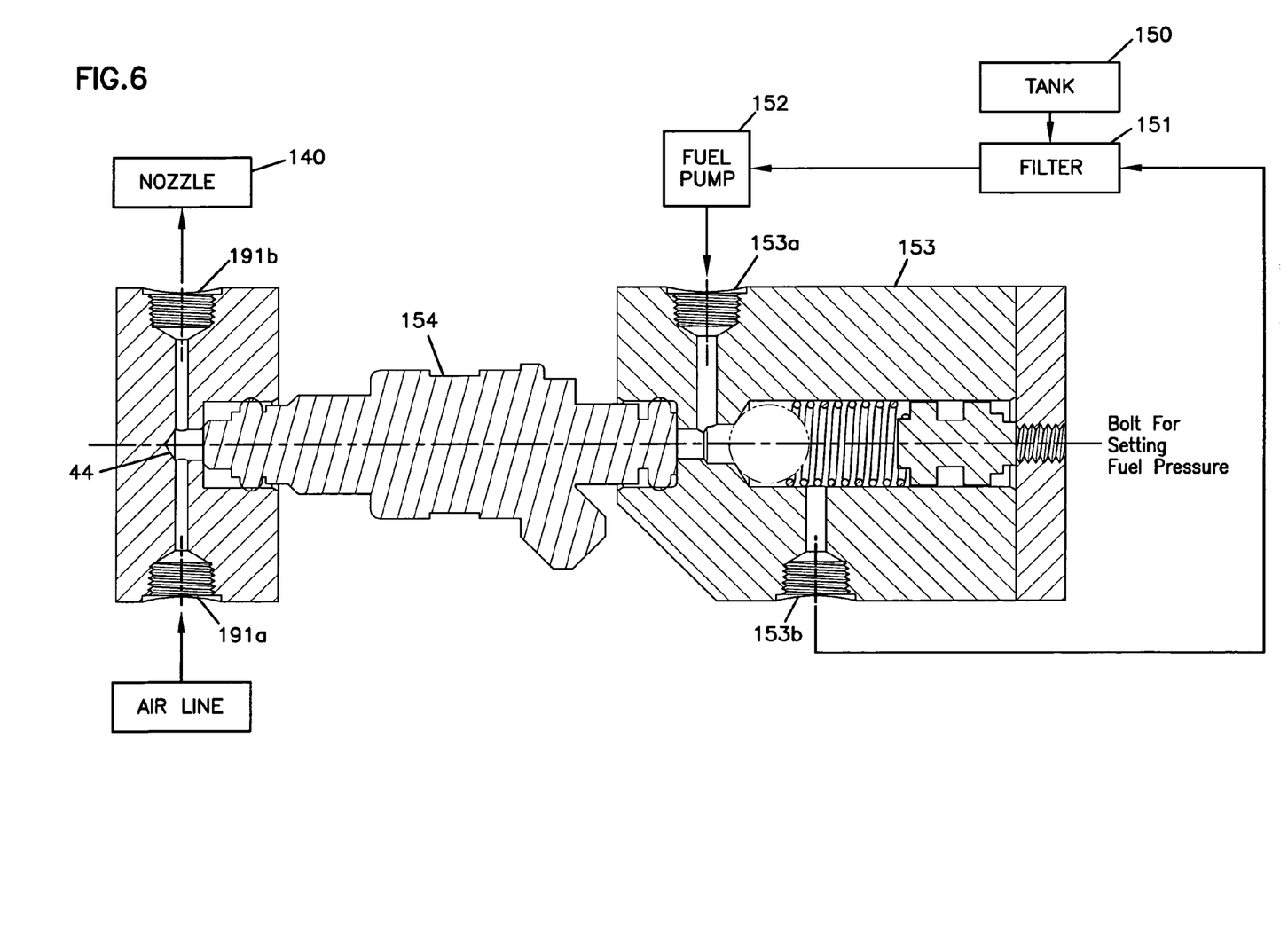
FIG. 6 is a cross-sectional view taken along section line 6-6 of FIG. 4.

Referring to FIG. 6, the injector 154 receives fuel from the regulator 153 and injects the fuel into the pre-mix region 144 defined by the mixing housing 191. The mixing housing 191 defines a first port 191a for supplying air to the pre-mix region 144 and a second port 191b for directing a mixture of air and fuel to the nozzle 140. Referring still to FIG. 6, the fuel regulator 153 defines a first port 153a for connection to the fuel pump 152 and a second port 153b for connection to the re-circulation line.

Figure 7:
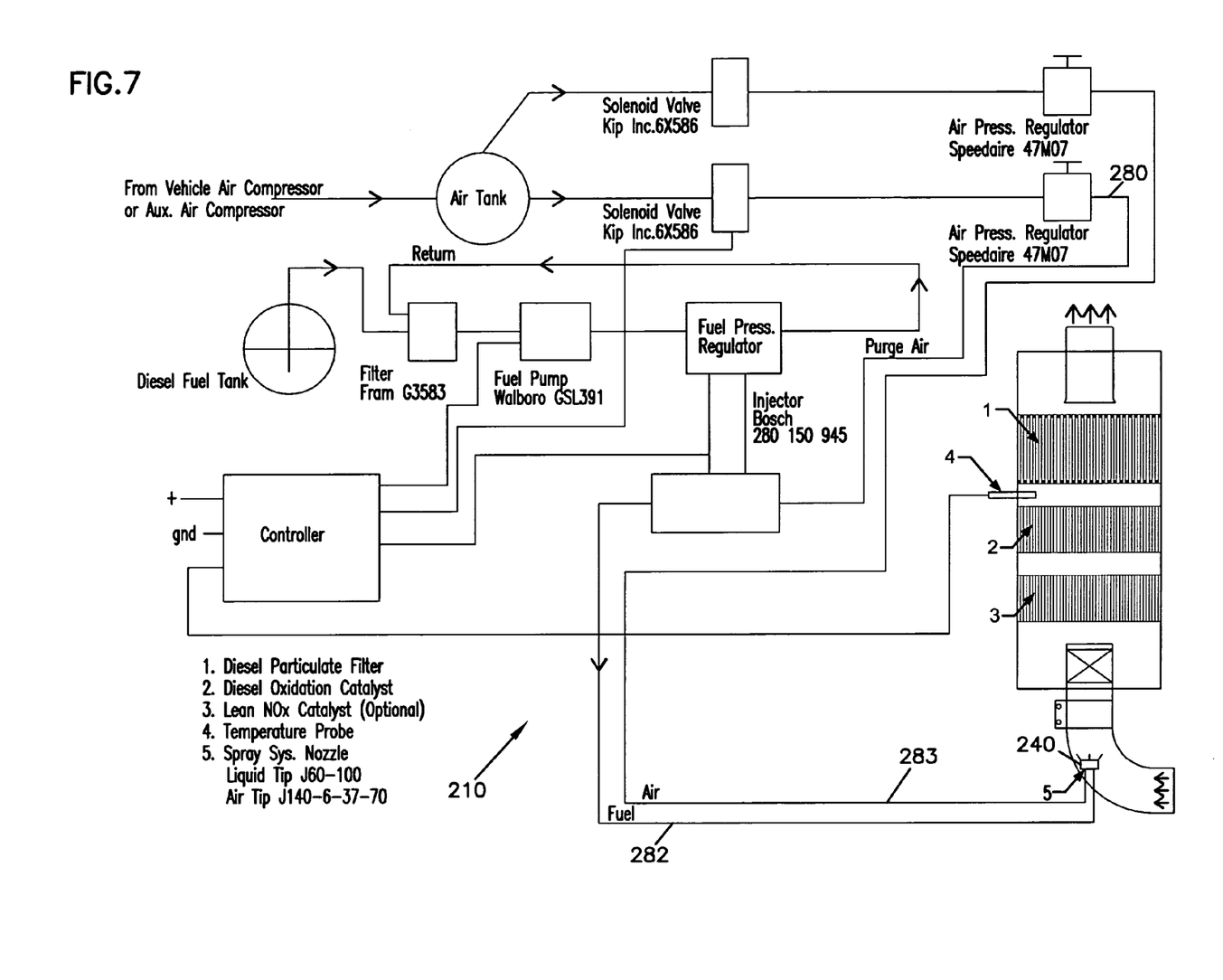
FIG. 7 schematically illustrates another alternative exhaust system.

FIG. 7 shows another exhaust treatment system 210 having the same configuration as the system of FIG. 2 except the air and fuel of the injection system are not pre-mixed, but are instead mixed at nozzle 240 as the air and fuel are injected into the exhaust stream. Fuel line 282 supplies fuel to the nozzle 240, and a separate air line 283 provides air to the nozzle 240. The embodiment of FIG. 7 preferably includes a purge air line 280 for purging fuel from fuel line 282.

In the above embodiments, fuel is injected into the exhaust stream to raise exhaust temperatures to a target temperature suitable for regenerating a diesel particulate filter. In other embodiments, the fuel injection systems disclosed herein can be use to inject fuel into an exhaust stream for other purposes such as to provide hydrocarbons to promote the conversion of NOx at a lean NOx catalyst or to provide hydrocarbons for regenerating NOx traps. A variety of control models can be used to control fuel injection rates for these alternative systems. Also, while it is preferred to inject fuel into the exhaust stream with a separate injector, other fuel supply techniques such as fuel injection from the engine (e.g., late cycle injection) are also included within the scope of the invention.

APPENDIX 1

Fuel Injection Control Example

| | Variable | Symbol | Unit | Regen Start Time = 0 | Time = 1 | Time = 2 | Time = 3 | Time = 4 | Time = 5 |
|---|---|---|---|---|---|---|---|---|---|
| System constants | Volume, control volume | V | $m^3$ | 2.68E−02 | 2.68E−02 | 2.68E−02 | 2.68E−02 | 2.68E−02 | 2.68E−02 |
| | Mass, DOC | M_DOC | kg | 2.750 | 2.750 | 2.750 | 2.750 | 2.750 | 2.750 |
| | Surface area, DOC flow exposed | A_DOC | $m^2$ | 20.0 | 20.0 | 20.0 | 20.0 | 20.0 | 20.0 |

APPENDIX 1-continued

Fuel Injection Control Example

|  | Variable | Symbol | Unit | Regen Start Time = 0 | Time = 1 | Time = 2 | Time = 3 | Time = 4 | Time = 5 |
|---|---|---|---|---|---|---|---|---|---|
| Application inputs | Lower heating value, fuel | $h\_1$ | MJ/kg | 43.2 | 43.2 | 43.2 | 43.2 | 43.2 | 43.2 |
|  | Time step | $\Delta t$ | sec | 1.0 | 1.0 | 1.0 | 1.0 | 1.0 | 1.0 |
| Constant | Gas constant, exhaust gas | R | J/kg-K | 286.7 | 286.7 | 286.7 | 286.7 | 286.7 | 286.7 |
| Sensor read | Temperature, CV inlet | $T\_1$ | deg C. | 255.0 | 255.0 | 255.0 | 255.0 | 255.0 | 300.0 |
|  | Temperature, CV exit | $T\_2$ | deg C. | 250.0 | 350.0 | 450.0 | 550.0 | 550.0 | 550.0 |
|  | Pressure, CV inlet | $P\_1$ | Pa | 7000.0 | 7500.0 | 8000.0 | 8500.0 | 8500.0 | 12000.0 |
|  | Pressure, CV exit | $P\_2$ | Pa | 6000.0 | 6500.0 | 7000.0 | 7500.0 | 7500.0 | 10000.0 |
|  | Mass flow rate, before injector | $m\_dot, 1$ | kg/s | 0.160 | 0.160 | 0.160 | 0.160 | 0.160 | 0.200 |
| Target | Temperature, CV exit | $T\_2des$ | deg C. | 350.0 | 450.0 | 550.0 | 550.0 | 550.0 | 550.0 |
| Mapped data | Evaporation efficiency, fuel | $\eta\_vap$ | — | 0.90 | 0.90 | 0.90 | 0.90 | 0.90 | 0.95 |
|  | Conversion efficiency, DOC | $\eta\_c$ | — | 0.50 | 0.60 | 0.70 | 0.75 | 0.75 | 0.85 |
|  | Heat transfer coefficient, gas-DOC | $h\_DOC$ | W/m^2-K | 10.0 | 10.0 | 10.0 | 10.0 | 10.0 | 10.0 |
| Calculated data | Temperature, CV average | $T\_cv, n$ | deg C. | 252.5 | 302.5 | 352.5 | 402.5 | 402.5 | 425.0 |
|  | Pressure, CV average | $P\_cv, n$ | Pa | 107800.0 | 108300.0 | 108800.0 | 109300.0 | 109300.0 | 112300.0 |
|  | Density, CV average | $p\_cv, n + 1$ | kg/m^3 | 7.15E−01 | 6.56E−01 | 6.07E−01 | 5.64E−01 | 5.64E−01 | 5.61E−01 |
|  | Specific heat, CV average | $C\_p, exh, n$ | J/kg-K | 1035.3 | 1045.7 | 1056.9 | 1068.7 | 1068.7 | 1074.1 |
|  | Temperature, CV average @ n + 1 | $T\_cv, n + 1$ | deg C. | 302.5 | 352.5 | 402.5 | 402.5 | 402.5 | 425.0 |
|  | Pressure, CV average @ n + 1 | $P\_cv, n + 1$ | Pa | 107800.0 | 108300.0 | 108800.0 | 109300.0 | 109300.0 | 112300.0 |
|  | Density, CV average @ n + 1 | $p\_cv, n + 1$ | kg/m^3 | 7.49E−01 | 4.95E−01 | 3.58E−01 | 2.94E−01 | 2.94E−01 | 2.93E−01 |
|  | Specific heat, CV average @ n + 1 | $C\_p, exh, n + 1$ | J/kg-K | 1045.7 | 1056.9 | 1068.7 | 1068.7 | 1068.7 | 1074.1 |
|  | Unsteady term |  |  | 1652.3 | −1820.8 | −3823.6 | −5226.2 | −5226.2 | −5396.9 |
|  | Mass flow rate, CV exit | $m\_dot, 2$ | kg/s | 0.160 | 0.161 | 0.162 | 0.162 | 0.162 | 0.203 |
|  | Specific heat, CV inlet | $C\_p, exh, 1$ | J/kg-K | 1035.8 | 1035.8 | 1035.8 | 1035.8 | 1035.8 | 1045.2 |
|  | Specific heat, CV exit | $C\_p, exh, 2$ | J/kg-K | 1056.3 | 1080.2 | 1104.2 | 1104.2 | 1104.2 | 1104.2 |
|  | Convective term |  |  | 17788.8 | 38148.9 | 59497.8 | 60108.3 | 60161.5 | 64314.7 |
|  | Temperature, means gas thru DOC | $T\_gas$ | deg C. | 252.5 | 302.5 | 352.5 | 402.5 | 402.5 | 425.0 |
|  | Temperature, DOC substrate | $T\_DOC$ | deg C. | 252.5 | 256.2 | 263.4 | 273.7 | 283.2 | 293.6 |
|  | Specific heat, DOC substrate | $C\_p, DOC$ | J/kg-K | 974.3 | 976.7 | 981.3 | 987.7 | 993.3 | 999.2 |
|  | Heat sink term |  |  | 0.0 | 9253.5 | 17819.9 | 25758.1 | 23861.5 | 26285.0 |
|  | Mass flow rate, fuel | $m\_dot, f$ | kg/s | 1.00E−03 | 1.95E−03 | 2.70E−03 | 2.77E−03 | 2.70E−03 | 2.44E−03 |

We claim:

1. A method for injecting fuel into a transient exhaust stream of an exhaust system, the exhaust system including a catalytic converter positioned upstream from a diesel particulate filter, the exhaust system also including a fuel dispenser positioned upstream from the catalytic converter, the method comprising:

selecting a control volume within the exhaust system, the control volume including the fuel dispenser and the catalytic converter; and using a fuel dispensing formula derived from a transient energy balance equation for the control volume to determine a fuel dispensing rate at which fuel is dispensed into the exhaust stream by the fuel dispenser, the fuel dispensing rate being controlled such that combustion of the fuel at the catalytic converter provides a target exhaust gas temperature downstream of the catalytic converter, the target exhaust gas temperature being suitable to cause controlled regeneration of the diesel particulate filter;

the transient energy balance equation including a number of factors, at least some of the factors including:

a net energy carried by the exhaust stream entering and leaving the control volume;

a heat release rate of the fuel to be dispensed into the control volume by the fuel dispenser taking into consideration a fuel vaporization efficiency and a fuel conversion efficiency at the catalytic converter; and a heat transfer rate between the catalytic converter and the exhaust stream.

2. A method for introducing a reactant into the exhaust stream of a an exhaust system for a diesel engine, the exhaust system including a substrate, a first temperature sensor positioned upstream from the substrate and a second temperature sensor positioned downstream from the substrate, the method comprising:

determining a calculated mean temperature of the substrate, the calculated mean temperature of the substrate being calculated and updated on an on-going basis taking into consideration a heat transfer coefficient between the exhaust stream and the substrate, a mass of the substrate, a surface area of the substrate, a specific heat of the substrate and an average temperature of the exhaust stream based on readings taken by the first and second temperature sensors; and using the mean temperature of the substrate as a parameter for controlling the introduction of the reactant into the exhaust stream.

3. The method of claim 2, wherein the substrate is catalyzed to promote a reaction of the reactant at the substrate.

4. The method of claim 3, wherein the reactant includes a hydrocarbon fuel, and wherein the hydrocarbon fuel is injected into the exhaust stream at a location upstream from the substrate.

5. The method of claim 4, wherein the substrate comprises a diesel oxidation catalyst.

6. The method of claim 4, wherein the substrate comprises a lean NOx catalyst.

7. The method of claim 4, wherein the substrate comprises a NOx trap.

8. The method of claim 1, wherein the catalytic converter and the diesel particulate filter are positioned within an exhaust conduit wherein the fuel dispenser includes an injector having a housing positioned outside the exhaust conduit for housing the reactant injector, the housing defining an air line port and a reactant line port, the housing also defining a pre-mix region into which the reactant injector injects reactant; wherein the exhaust system includes a reactant line coupled to the reactant line port of the housing for providing reactant to the reactant injector, wherein the exhaust system includes an air line coupled to the air line port of the housing for providing compressed air to the pre-mix region, the reactant from the injector and the air from the air line being mixed at the pre-mix region to form a reactant/air mixture, wherein the exhaust system includes a nozzle for spraying the reactant/air mixture into the exhaust conduit, and wherein the exhaust system includes a mixed reactant/air conduit for conveying the reactant/air mixture from the pre-mix region of the housing to the nozzle.

9. The method of claim 8, wherein a fuel pressure supplied to the injector is 40 to 100 pounds per square inch.

10. The method of claim 8 wherein an air pressure supplied to the pre-mix region is 10 to 50 pounds per square inch.

11. The method of claim 8, wherein a pressure of the fuel supplied to the injector is 30 to 50 pounds per square inch greater than a pressure of the air supplied to the pre-mix region.

12. The method of claim 8, wherein an air pressure regulator in fluid communication with the air line regulates the pressure of the air within the air line.

13. The method of claim 8, wherein a solenoid valve in fluid communication with the air line controls the flow of air within the air line.

14. The method of claim 8, wherein the housing includes a first block and a second block between which the injector is mounted.

15. The method of claim 1, wherein the exhaust system includes a first temperature sensor positioned upstream from the catalytic converter and a second temperature sensor positioned between the catalytic converter and the diesel particulate filter, wherein the fuel dispensing formula includes a calculated mean temperature of the catalytic converter, the calculated mean temperature of the catalytic converter being calculated and updated on an on-going basis taking into consideration a heat transfer coefficient between the exhaust stream and the catalytic converter, a mass of the catalytic converter, a surface area of the catalytic converter, a specific heat of the catalytic converter and an average temperature of the exhaust stream based on readings taken by the first and second temperature sensors.

16. The method of claim 15, wherein the calculated mean temperature of the catalytic converter is calculated by the formula:

$$T_{DOC_n} = \frac{hA_{DOC}\Delta t}{m_{DOC}c_{p_{DOC}}}(T_{gas} - T_{DOC_{n-1}}) + T_{DOC_{n-1}};$$

where $T_{DOC_n}$ is the calculated mean temperature of the catalytic converter, h is the heat transfer coefficient between the exhaust stream and the catalytic converter, $A_{DOC}$ is the surface area of the catalytic converter, $m_{DOC}$ is the mass of the catalytic converter, $C_{pDOC}$ is the specific heat of the catalytic converter, $T_{gas}$ is the average temperature of the exhaust stream within the catalytic converter, and $T_{DOC_{n-1}}$ is a previously calculated mean temperature of the catalytic converter.

17. The method of claim 16, wherein the fuel dispensing formula comprises:

$$\dot{m}_f = \frac{\left\{\left[\frac{(\overline{P}_{cv}V_{cv}c_p)_n - (\overline{P}_{cv}V_{cv}c_p)_{n-1}}{R\Delta t}\right] + [(\dot{m}_2 c_p T_{2_{des}}) - (\dot{m}_1 c_p T_1)] + hA_{DOC}(T_{gas} - T_{DOC})\right\}}{\eta_{vap}\eta_c h_l}$$

where $\dot{m}_f$ is a calculated fuel mass flow rate for reaching the target exhaust gas temperature, $\overline{P}_{ev}$ is a pressure at the control volume, $V_{cv}$ is a volume of the control volume, $C_p$ is a specific heat of the exhaust stream, R is an ideal gas constant for the exhaust stream, $\dot{m}_1$ is a mass flow rate of the exhaust stream upstream from the catalytic converter, $T_{2des}$ is the target exhaust stream temperature downstream of the catalytic converter, $\dot{m}_2$ is a mass flow rate of the exhaust stream downstream from the catalytic converter, $T_1$ is an exhaust stream temperature upstream from the catalytic converter, $\eta_{vap}$ is the fuel vaporization efficiency, $\eta_c$ is the fuel conversion efficiency at the catalytic converter, and $h_l$ is a fuel lower heat value.

18. The method of claim 1, further comprising calculating exhaust mass flow for the exhaust system using pressure data provided by a first pressure sensor positioned upstream from a venturi and a second pressure sensor positioned at a restriction of the venturi, and using the mass flow in concert with the fuel dispensing formula to determine the fuel dispensing rate.

19. The method of claim 18, wherein exhaust gas mass flow is determined by a mass flow sensor.

20. The method of claim 18, wherein exhaust gas mass flow is determined by accessing data from an engine controller.

21. The method of claim 1, wherein the desired exhaust gas temperature for causing controlled regeneration at the diesel particulate filter is in the range of 500 to 700 degree Celsius.

22. The method of claim 3, wherein the calculated mean temperature of the substrate is calculated by the formula:

$$T_n = \frac{hA\Delta t}{mc}(T_{gas} - T_{n-1}) + T_{n-1};$$

where $T_n$ is the calculated mean temperature of the substrate, h is the heat transfer coefficient between the exhaust stream and the substrate, A is the surface area of the substrate, m is the mass of the substrate, $c_p$ is the specific heat of the substrate, $T_{gas}$ is the average temperature of the exhaust stream within the substrate, and $T_{n-1}$ is a previously calculated mean temperature of the substrate.

* * * * *

UNITED STATES PATENT AND TRADEMARK OFFICE
CERTIFICATE OF CORRECTION

PATENT NO. : 7,337,607 B2
APPLICATION NO. : 10/560401
DATED : March 4, 2008
INVENTOR(S) : Hou et al.

It is certified that error appears in the above-identified patent and that said Letters Patent is hereby corrected as shown below:

Col. 14, line 10, claim 8: "a reactantlair mixture," should read --a reactant/air mixture,--

Signed and Sealed this

Twenty-seventh Day of January, 2009

JOHN DOLL
*Acting Director of the United States Patent and Trademark Office*